United States Patent [19]
Donaldson et al.

[11] Patent Number: 4,791,661
[45] Date of Patent: Dec. 13, 1988

[54] PORTABLE EPROM PROGRAMMING AND DATA TRANSFER APPARATUS

[75] Inventors: Stuart G. Donaldson, Kirkland; Hendrik W. Groeneveld, Everett; Christiaan Klumper, Lynnwood; Robert T. Miller, Seattle; Richard W. Whitbeck, Snohomish; Robert H. Longnecker, Edmonds, all of Wash.

[73] Assignee: Global Technology International, Inc., Everett, Wash.

[21] Appl. No.: 880,791

[22] Filed: Jul. 1, 1986

[51] Int. Cl.$^4$ .................................. H04M 11/00
[52] U.S. Cl. ............................. 379/96; 379/93
[58] Field of Search .......... 179/2 DP; 379/93, 95, 379/96, 97, 98

[56] References Cited

U.S. PATENT DOCUMENTS

| | | | |
|---|---|---|---|
| 4,122,532 | 10/1978 | Dlugos et al. | 364/900 |
| 4,244,032 | 1/1981 | Oliver | 364/900 |
| 4,441,164 | 4/1984 | Pavon et al. | 364/900 |
| 4,460,982 | 7/1984 | Gee et al. | 365/189 |
| 4,498,151 | 2/1985 | Henry | 364/900 |
| 4,503,288 | 3/1985 | Kessler | 179/2 DP |
| 4,578,751 | 3/1986 | Erwin | 364/200 |
| 4,597,058 | 6/1986 | Izumi et al. | 364/900 |

FOREIGN PATENT DOCUMENTS 2531800  2/1984  France .................................. 379/95

OTHER PUBLICATIONS

Battat et al., "EE-PROM Goes to Work", Electronics, May 1981.
Brochure, Maverick Microsystems International, Inc., "Ace Download Computer for the MICR 1", on sale prior to Jul. 1985.

Primary Examiner—Keith E. George
Attorney, Agent, or Firm—Graybeal, Jensen & Puntigam

[57] ABSTRACT

The apparatus includes a socket (13) for receiving an EPROM (18) to be programmed, a telephone interface (11), an RS-232 port (14), and RAM storage 20. Each of the user elements can be a source or destination of data. A microprocessor (52), and an internal EPROM (54) which includes firmware for programming EPROM (18) control the operation of the apparatus, providing the operator a series of prompts through display 15 to which the operator responds through the operation of "yes", "no" and "cancel" buttons.

15 Claims, 14 Drawing Sheets

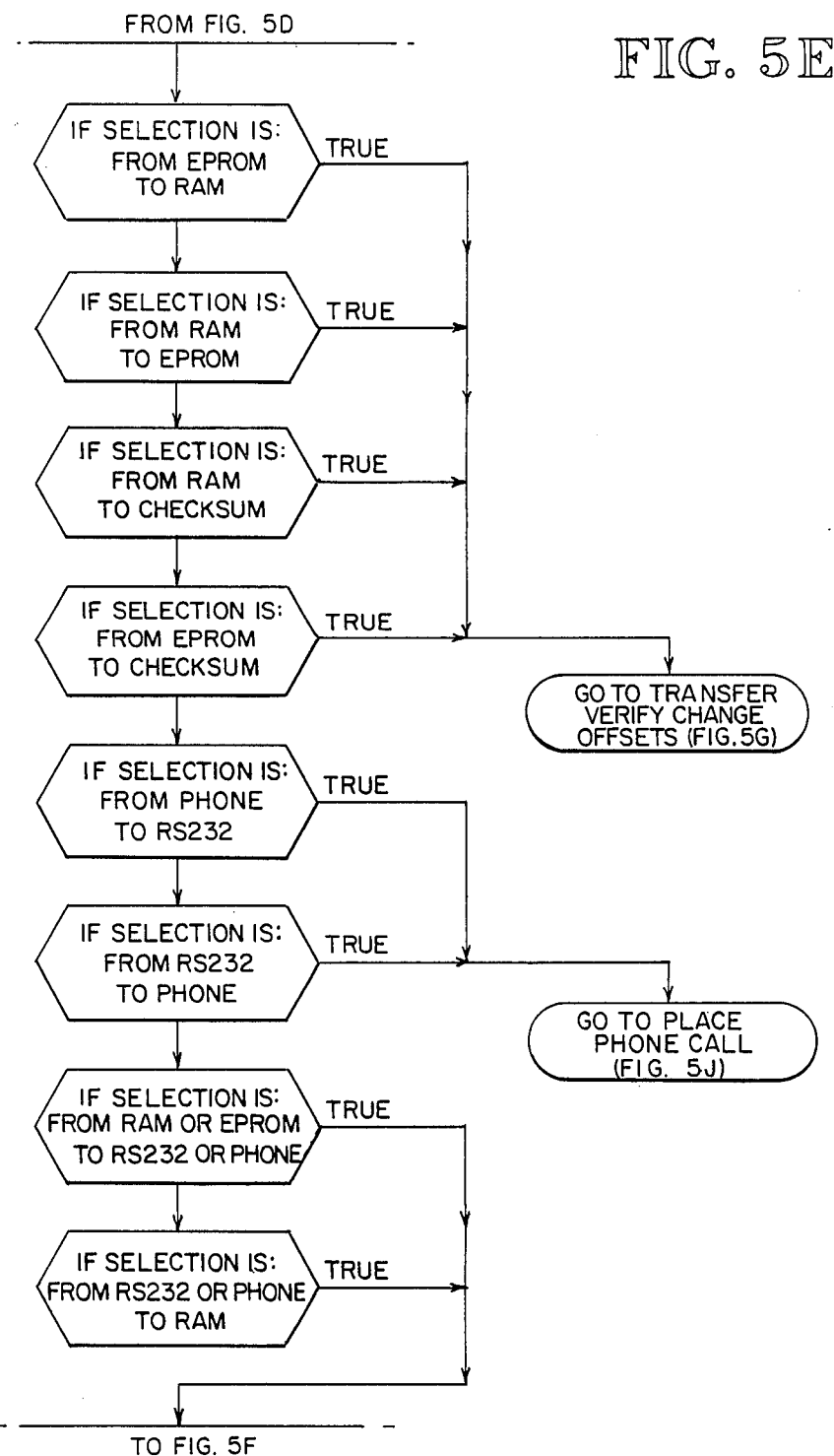

PORTABLE EPROM PROGRAMMING AND DATA TRANSFER APPARATUS

TECHNICAL FIELD

This invention relates generally to apparatus for programming EPROMS and like devices, and more particularly concerns such an apparatus which is portable so that it can be carried to the site of the EPROM to be programmed and which is capable of programming a wide variety of EPROMS with programming information received from a remote source, as well as itself operating as a data transfer device.

BACKGROUND ART

General purpose EPROM (erasable programmable read only memory) programming apparatus are well known, but are typically sophisticated devices which require a trained engineer or computer programmer to operate. After an EPROM has been programmed by such a device and is on site in the field, only limited servicing or modification of the EPROM and the program stored therein is typically possible on site, and then only by trained service personnel. The same is true for other programmable memory devices which store a computer program, which are generally referred to as firmware. Examples of such other memory devices include EEPROMS (electrically erasable programmable read-only memory devices) and PALs (programmable array logic devices).

Typically, when there is an error in, or other problem with, the firmware, or if the firmware is to be modified or updated, the standard procedure is to send a trained engineer from a central site or origin of the firmware to the remote site of the firmware. If the problem cannot be solved on site or if a replacement EPROM will not solve the problem, the EPROM must be removed and taken back to the central site, along with the relevant information concerning the problem. Even if the EPROM problem can be corrected at that point, however, such a method of program correction or repair is expensive and time consuming and usually results in loss of customer goodwill.

DISCLOSURE OF THE INVENTION

Accordingly, applicant has originated a remote programming apparatus capable of conveniently operating in the field for servicing and/or reprogramming of firmware devices, such as EPROMSs, with the EPROM programming information being transmitted from a source remote from the apparatus or previously stored in memory in the apparatus itself. The apparatus includes means for receiving an EPROM or similar device; means for accepting programming information for the EPROM from a remote source; means for accepting programming information for the EPROM from a computer means; means within the apparatus for storing said programming information; and means for programming a wide variety of existing EPROM devices with such programming information, wherein the apparatus is characterized by being arranged such that it can be conveniently carried to the site of the EPROM to be programmed.

In more detail, the apparatus includes means for communicating with a remote source of programming information via the telephone lines, and means for communicating directly with a computer via a serial port. Thus, the apparatus can receive programming information from a variety of source devices and provide such information to a variety of destination devices. The apparatus has the capability of storing such programming information internally for later programming use. The apparatus includes circuitry and control capability for programming virtually all commercially available EPROM devices, including the capability of adding new programming algorithms as they may become available. Further, with the serial port and the telephone communication capability, including a built-in modem, the apparatus is capable of transferring data directly between its RS232 port and the telephone lines, so that the apparatus can function as a remote diagnostic communications device between a remote computer and a central location.

BRIEF DESCRIPTION OF THE DRAWINGS

FIGS. 5A–5K are a series of flow charts which show in more detail the subject matter of FIG. 4.

BEST MODE FOR CARRYING OUT THE INVENTION

Figure 1:
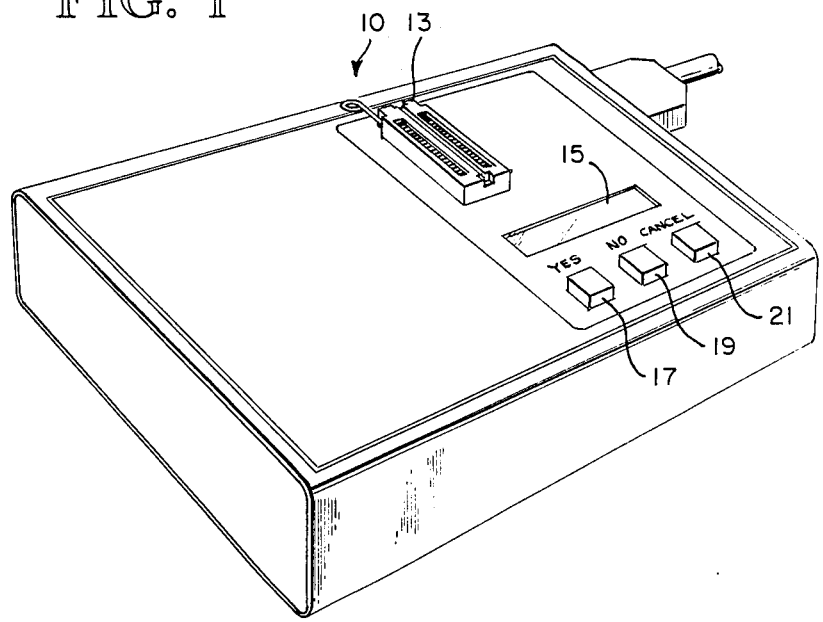
FIG. 1 is a schematic view of the exterior of the apparatus of the present invention.
Figure 2:
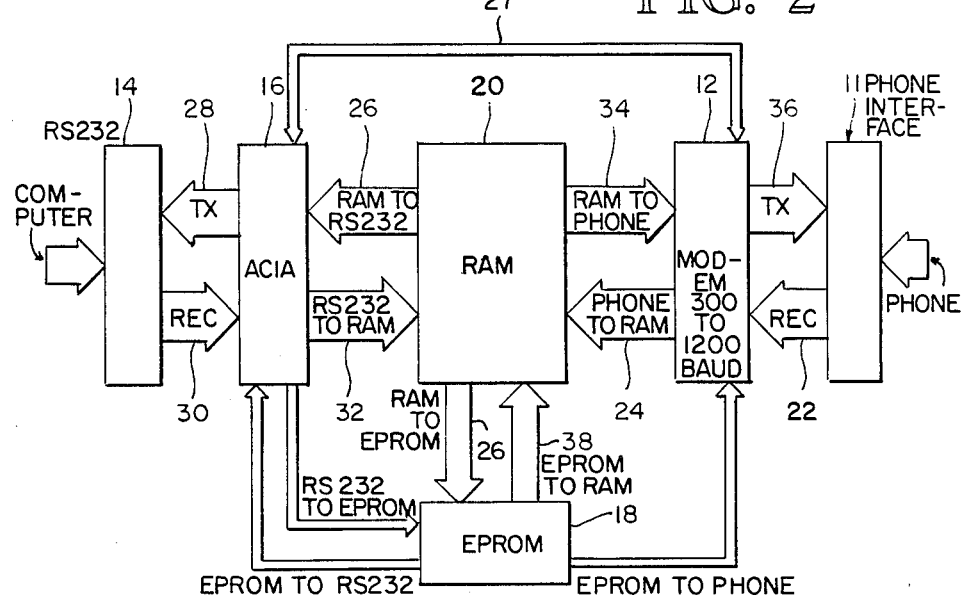
FIG. 2 is a diagram showing the flow of data within the apparatus of the present invention.
Figure 3:
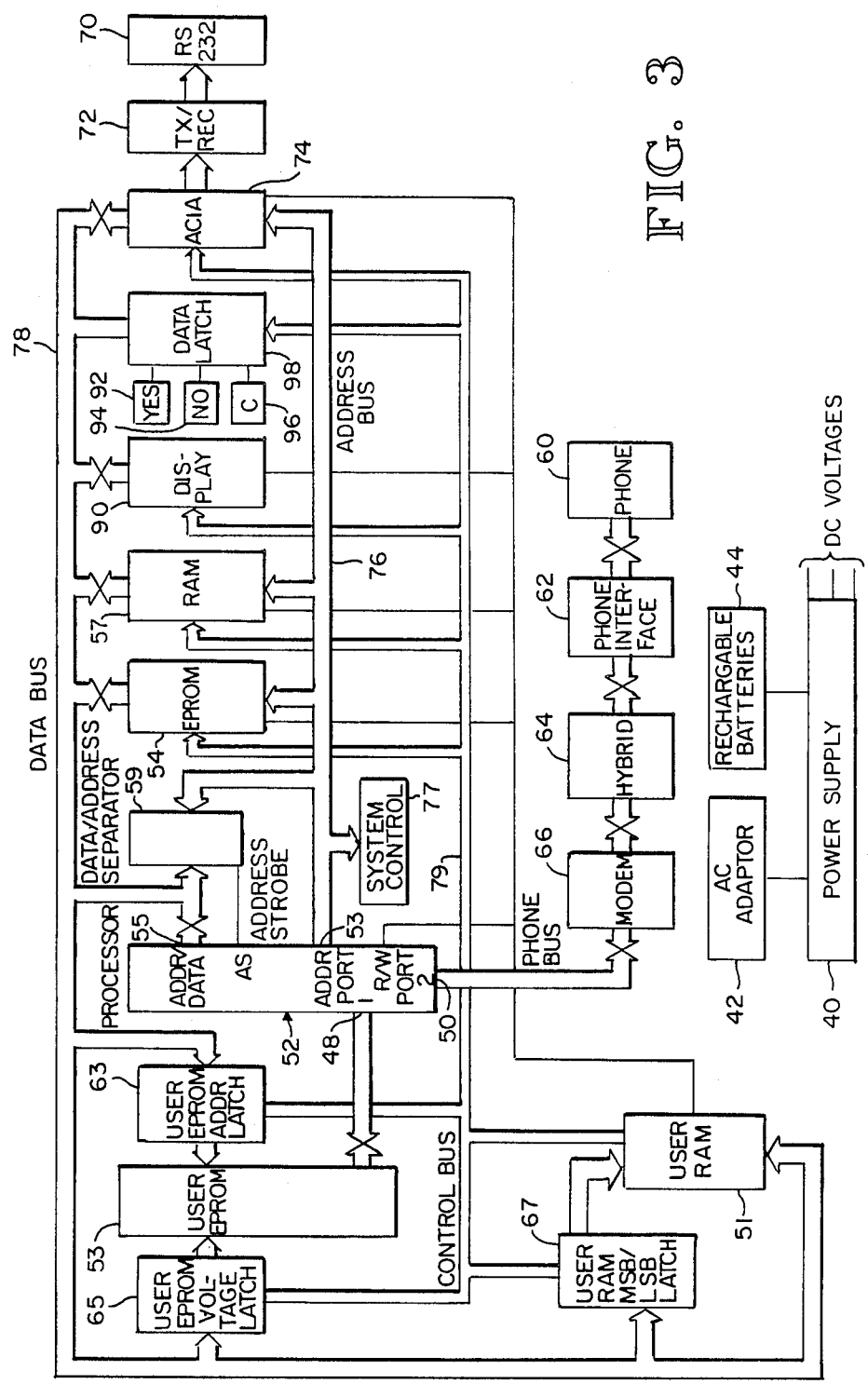
FIG. 3 is a hardware block diagram of the apparatus of the present invention.

Referring to FIGS. 1–3, an apparatus is shown which is capable of receiving an EPROM or similar device and conveniently programming, including reprogramming, that EPROM at a remote site. The apparatus includes programming circuitry and control firmware to program the EPROM or similar device at the site of the device, using programming information received from any one of a number of sources of programming information, including remote sources, via the telephone lines or directly from a computer, or an internal source, i.e. programming information which has been previously stored in RAM in the apparatus itself. More broadly, the apparatus is an information transfer or exchange device between four user elements, in which information received from any one of the four user elements can be directed to any of the remaining three user elements.

FIG. 1 is an external view of the apparatus of the present invention, shown generally at 10, including a means 13 for receiving an external EPROM and a two-line display 15 by which simple prompts, i.e. requests for instructions, are provided to the operator to accomplish the programming of the EPROM and/or data transfer. The operator in turn provides instructions through three buttons, a "yes" button 17, a "no" button 19, and a "cancel" button 21.

FIG. 2 shows the various information paths within the apparatus. The apparatus microprocessor, which controls the actual operation of the apparatus, is not specifically shown in FIG. 2, but essentially controls the pattern of information flow within the apparatus and the individual blocks shown. In FIG. 2, four user-accessible elements are shown, i.e. EPROM 18, RAM 20, RS232 port 14, which interfaces with a computer, and telephone interface 11, which interfaces with the telephone lines, each of which can function as information sources and information destinations.

The telephone interface block 11 includes all of the necessary protocol and circuit elements for interfacing a standard telephone receiver with a conventional modulator/demodulator (modem) 12, which is provided internally of the apparatus 10. The RS232 element 14 is standard nomenclature for a serial port having certain specified wire connections, including a standard DB-25 connector, for direct communication with an external computer. Connected to the RS232 unit 14 is an asynchronous communication interface adaptor (ACIA) 16, which is a conventional data communication and formatting device permitting data communication with the internal memory RAM of the apparatus.

EPROM 18 is connected directly to the apparatus through the external socket 13. EPROM 18 can be used as a source of information to the other user elements as well as a destination for programming information. RAM memory 20 is completely internal of the apparatus. Most of the information which flows through the apparatus is at some point in its path stored at least temporarily in RAM 20.

When information is received at the apparatus over the phone lines in the form of a modulated signal, i.e. information which is received at phone interface 11, that information moves via receive path 22 to the modem 12, which demodulates the signal, and then via path 24 to RAM 20. At RAM 20, the information can be stored either temporarily, or for longer periods.

From RAM 20, the information can be used to program or "burn" EPROM 18, such as indicated by path 26, through the use of the processing circuitry in the apparatus and the correct programming algorithm for that particular EPROM. Alternatively, the information can be directed from RAM 20 to ACIA 16, on path 26, then to the RS232 serial port on transmit line 28 and then to a computer.

A computer interfaces with the apparatus 10 through the RS232 connection 14. Information at connection 14 moves to the ACIA element 16, as indicated by receive path 30, and from there moves to the RAM 20, as indicated by path 32. From the RAM, the information can be used to program 18 EPROM as indicated by path 26, as explained above with respect to information received over the phone lines.

Computer produced information from the RS232 unit 14 can also be applied through RAM 20 to modem 12 and then through phone interface 10 for transmission over the phone lines. The direct transfer of data between the phone lines and the computer can be accomplished over data path 27, bypassing the RAM 20. In this mode, the apparatus is in effect emulating the operation of a MODEM.

EPROM 18 can also be used as a source of information, i.e. the firmware present in the EPROM can first be moved to RAM 20, and from there to phone interface 11 or the RS232 unit. The flow of data from the EPROM 18 to RAM 20 is represented by path 38.

RAM 20 can be a source of information. The data in RAM 20 can be applied to the phone interface 11 and then to the phone lines to a remote destination, or to the RS232 unit 14 and from there to a computer or like device such as another telephone, or also directly to the EPROM 18, over data path 26.

Thus, each of the four major user elements shown in FIG. 2, i.e. RAM 20, phone interface 11, RS232 unit 14, and EPROM 18 can be used either as a source of information, or a destination of information relative to each of the other elements. For that reason, the apparatus is capable of being used in one configuration as a portable information transfer apparatus.

In one primary use, the apparatus 10 is capable of programming an EPROM at its site from a remote source. The reprogramming of the EPROM might be necessary to repair a defect in the firmware or simply to replace the firmware or portions thereof. To do this, EPROM 18 is inserted into the apparatus at the site of the EPROM, and then through a series of simple prompts or instructions appearing on the display 13, which will be explained in more detail hereinafter, the operator can quickly and conveniently reprogram the EPROM as needed, with the programming information coming from a remote source over the phone lines through phone interface 10, or from a computer through RS232 unit 14, or from information which has been previously stored in RAM 20.

As an example, an operator having the present invention at the site of a defective EPROM can transmit the contents of that EPROM to a central facility where it can be analyzed by trained engineers or programmers. The program can be repaired there and then transmitted back to the apparatus, where it is stored in RAM and then used to reprogram the EPROM. The EPROM must necessarily have been previously erased, or an erased substitute EPROM must be used.

Alternatively, the apparatus can be used as a modem for communication between a computer and a remote diagnostic facility. This is helpful to implement remote diagnostics for those computers and other units which do not have built-in modems. The required diagnostic data from the computer is applied directly into the apparatus through the RS232 unit 14, moves through ACIA 16, data path 27, modem 12 and interface 11 before being transmitted over the phone lines to the remote diagnostic computer. The response from the remote diagnostic computer will be over the same path.

As another example of the use of the present apparatus for remote diagnosis, a correct "download" of the contents of an EPROM can be loaded into RAM 20 from a remote diagnostic computer through telephone interface 11 and modem 12. The suspected defective local EPROM can then be inserted into EPROM socket 13, and its contents can be compared, bit by bit, with the correct EPROM contents in RAM 20 received from the remote source. This permits a determination of whether the problem with the local EPROM is caused by corruption, i.e. altering, of its once correct firmware, or whether in fact there is an error in the "correct" firmware.

In addition to the above operational modes directly involving an EPROM, The apparatus 10 is also capable of operating in an internal diagnostic mode and a so-called preferences mode, because of certain subroutines in the apparatus firmware. In the diagnostic mode, the apparatus performs a self-diagnosis, including debugging of telephone and other modem related problems.

In self-diagnosis, the user RAM can be reviewed address-by-address so that addressing problems, such as shorted address lines, or internal chip problems may be located. The external EPROM socket can be tested by applying selected voltages to the various pins of the EPROM and verifying the presence of the voltage and the current level thereof at those pins. Further, the telephone connections can also be interrogated with respect to the type of carrier, the length of the data characters, and the Baud rate.

In the preferences mode, the operator is permitted to establish the various parameters, i.e. the preferences, governing the operation of the apparatus. For instance, the operator has the capability of predetermining the quantity of prompts presented to the operator for specific operations. In one form, a greater, more repetitive, number of prompts are provided, while in another form, relatively few prompts are provided, which would be appropriate for a sophisticated user. In the preferences mode, the RAM may also be cleared, and acknowledge/negative acknowledge ("Ack/Nak") protocol for both incoming and outgoing communications may be set or deleted, and the same with respect to certain verification characters for telephone communication.

Still further in the preferences mode, the data packet length may be varied, the maximum time out between records and between characters of a record may be established, as well as the number of nulls to be sent after each carriage return character and each line feed character. The preferences mode permits the operator a certain basic operational control over the function of the apparatus. The diagnostic and preferences modes, while not essential to the primary function of the apparatus, nevertheless provide additional operational flexibility.

FIG. 3 shows a block diagram of the apparatus of the present invention. A power supply 40 provides a plurality of DC voltages for the apparatus including the voltages necessary for programming EPROMS, including specifically 5 volts, 6 volts, 12.5 volts, 21.5 volts and 25 volts. The power source for power supply 40 is either conventional wall voltage through an AC adapter 42, or batteries 44. In the battery mode, the apparatus is fully portable. The microprocessor 52 is a commercially available eight bit multi-function processor, with a 16 bit address capability. It thus can address a maximum number of 64K locations. The processor 52 includes a parallel port 48, a serial port 50, a parallel address bus port 53 serving address bus 76 and a parallel data port 55 serving data bus 78. One current example of such a processor is a Hitachi HD63BO3RP, which is a CMOS equivalent of a Motorola 6803.

The microprocessor in the embodiment shown has 40 pins, which is an insufficient number for the physical connections required to the rest of the apparatus, which includes 16 address lines and 8 data lines. To overcome this limitation, the apparatus includes what is referred to as a data/address separator unit 59, which is basically a conventional latch circuit. A total of 16 connections are used to accommodate 16 address lines and 8 data lines. This is done by multiplexing the first 8 bit of the address with 8 data bits. The 8 address bits appear first and these bits are in effect separated from the multiplexed data by the control signals referred to as "address strobe" in FIG. 3 and these bits are then added with the remaining 8 address bits from the processor on address bus 76. The data bits follow the data bus 78.

The latch circuit referred to above is a well-known hardware element having three input lines, specifically "set", "data", and "reset", as well as one output line. The signal on the data line when the set line is pulsed is applied to the output line and maintained on the output line at that original level, regardless of subsequent fluctuations in the signal level on the data line, until the reset line is pulsed.

The apparatus also includes an 8K working memory in RAM 57 for the microprocessor 52 as well as a 32K RAM 51, which is a user RAM, which is expandable to 64K in the embodiment shown, for information storage, such as for the programming information used to program user EPROM 53. The firmware to control the programming of EPROM 53 is in internal EPROM 54.

The connection to a remote location via the telephone lines is accomplished through a conventional telephone receiver 60 and a telephone interface 62. The telephone interface 62 is a commercially available unit which sets the correct signal levels for the telephone line, and is certified by the FCC. Hybrid circuit 64 is another circuit of conventional design, commercially available, which interfaces telephone interface 62 with the internal modem 66 and sets the modem signal at the correct level for interface 62. In the embodiment shown, modem 66 is capable of operating at either 300 or 1200 baud rates in a full duplex mode, and is connected to serial port 50 of the microprocessor 52.

Direct connection to a computer or similar device is through the RS232 unit 70 which is a serial port characterized by particular voltage and current levels in accordance with Electronic Industry Association (EIA) standards RS-232-C and RS-449. RS-232 transmit/-receive line driver/receiver integrated circuits 72, of conventional design, connect the RS232 unit 70 to an ACIA unit 74. The ACIA unit converts the data from the RS232 unit, which is in serial form, into a parallel format for movement into RAM and vice versa. In one direction, the ACIA unit will remove the start and stop bits from each character in a serial stream of data and then arrange the 8 remaining data bits in parallel, while in the other direction, the ACIA unit will serialize the 8 parallel data bits of each character and add start and stop bits.

The ACIA unit is addressed by processor 52, along address bus 76, while data is transmitted to and from the ACIA unit over data bus 78. The operation of ACIA unit is controlled by system control unit 77 through control bus 79.

The transfer of data from a computer through the RS232 unit can be varied from 50 Baud to 19,200 Baud in all standard increments. Further, the apparatus is programmed to recognize five formats for incoming data at the RS232 unit, specifically four standard data formats as used by Intel, MOS Technology, Motorola and Tektronix, and a fifth novel format explained in more detail below. The apparatus will select the proper mode based on recognition of the format of the incoming data.

The four formats mentioned above cover substantially all existing EPROM programming. A fifth data format, referred to as condensed protocol records (CPR), was designed by the inventors herein for use in transferring EPROM data between the user elements associated with the present invention, particularly in light of the use of telephone lines in the transmission of data. In the above four formats, data is transmitted in data packets with appropriate header information and accuracy checks, with the data in the form of double ASCII characters, which eliminates the possibility of the data otherwise being identical, in some cases, to characters previously reserved for certain printer commands and the like. The result of the double ASCII character, however, for each binary character, is a doubling of the length of the data to be transmitted, and thus a doubling of the period for transmission of the data.

In the CPR format, the data is transmitted directly in binary form, which results immediately in almost a 50% time savings in data transmission. This is possible because the user elements do not involve reserved commands which can be confused with data characters. The standard CPR format includes the following sequence. Byte number 1 is a sync byte (hexadecimal 2A); byte number 2 is a type-of-packet byte (hex 66, for "data" type); byte number 3 is the address of the most significant byte for the data to be transferred; byte number 4 is the address of the least significant byte of the data to be transferred; byte numbers 5 and 6 are the ones complement, respectively, of the address of the most and least significant bytes; byte number 7 is the length of the data in the packet, byte number 8 is the ones complement of the length of the data in the packet; bytes 9 through n are the data bytes; and bytes n+1 and n+2 are a two byte cyclic redundancy check of the data.

A significant feature of the CPR format is data compression, in which a ten byte packet is used for from between 10 to 250 bytes of repetitive data. The firmware in the apparatus, in formatting the data, looks ahead for repetitive data. Repetitive data is in fact a frequent occurrence with EPROM data transfers because it is general practice to fill up the EPROM with characters, such as zeros, when the EPROM capacity is larger than the data to be entered.

When repetitive data is ascertained, the record is formatted in the following sequence. The first byte as well as bytes 3-8 are the same as the standard data CPR format. Byte 2, the type-of-packet byte, is a hex CC which indicates that the data in the record is compressed. Byte 9 is the repetitive data byte, while byte 10 is the ones complement of the data. Byte 7 specifies the length of the data, thus indicating the number of repetitive bytes of the included data byte that are to be replicated at the receiving end. Although the length of data in one compressed record is always just 10 bytes in length, up to 255 bytes of like data is produced at the receiving end, as set by the length byte (byte 7) in the compressed record. This results in substantial time savings for the transmission of repetitive data.

No cyclic redundancy checks are sent for the compressed data records. The complement of the data is a sufficient error check. An acknowledge signal (a hex 06 byte) is sent at the end of the transmission by the receiving party to indicate that the last packet was received correctly. A negative acknowledge, hex 15, is sent by the receiving part to indicate that there was an error in the received packet.

When the CPR protocol is initialized, the transmitting party sends a START character (hex 24) to get the attention of the receiving party. When the receiving party receives the START character, it responds with a CONTINUE character (hex 21) which indicates that the receiver is ready to receive data from the transmitting party. The data packets are then transmitted in the CPR format.

The user EPROM 53 is, as explained above, inserted by the operator in the external socket 13 of the apparatus. In programming the EPROM, the individual pins of the EPROM are addressed through EPROM address latch circuits 63 which latch the most significant bit and the least significant bit of the address in the EPROM being programmed. The known correct programming voltage for a particular EPROM is applied to the EPROM through another pair of latch circuits 65. The correct programming information, including pin numbers and voltage, is contained in a programming algorithm established by the manufacturer of each EPROM. The so-called "fast" algorithms, specified by the EPROM manufacturers, for substantially all commercial EPROMS, are stored in apparatus EPROM 54. The fast algorithm for the particular EPROM instead controls the programming of the EPROM with the aid of latch circuits 63 and 65.

The latch elements 63 and 65 used with the user EPROM 53 and the latch circuit 67 associated with user RAM 51 are part of a latched address and pointer approach to memory storage and access. Such a technique is used in the computer industry to, among other reasons, increase addressing capability of a given microprocessor. Microprocessor 52 can address a maximum of 64K locations. However, the total locations which the microprocessor 52 should be capable of addressing in the present apparatus are more than 64k, including the locations in the internal EPROM, the various RAMs, the user EPROM, the display, etc. The latch circuits provide in essence an expanded addressing capability for the processor, through hardware control, so that a lower capability processor can be used.

Further, the apparatus is arranged to operate in a so-called offset mode relative to EPROM programming, so that the EPROM need not be completely programmed in one pass. A first programming pass may be made with information in a first set of given locations in user RAM 51. A second and subsequent passes then could start at the location in EPROM where the previous pass left off or at any other user-defined starting address, and also could start in user RAM 51 where the next pass of data is located, or at any other user defined location.

This technique permits the efficient use of lower cost elements, permits multiple pass programming of larger capacity EPROMS, such as 1024K, that would otherwise be too large to program in one pass, and further, permits partial EPROM programming as well as the comvining* of EPROM programming source data from more than one input source file, i.e. so-called "dynamic linking" of EPROM programming data from more than one source. Such capabilities could be of particular benefit during a "machine down" situation by reducing the time necessary to re-link or re-compile program data into one large file.

In addition to the display 90, shown as 15 in FIG. 1, there are three control buttons on the face of the apparatus, a "yes" button 90, a "no" button 94, and a "cancel" button 96, corresponding to numerals 17, 19 and 21, respectively, in FIG. 1. Electrically connected to the buttons is an internal latch circuit 98 (FIG. 3). Operation of a button sets the output of the latch at a defined level and maintains it there.

In operation, the apparatus will typically first provide a series of prompts in the form of questions to identify the source of the information to be used in the programming of an EPROM or other data transfer. Operation of the "no" button will result in the display scrolling until the correct source is identified. At that point the "yes" button is operated.

To a certain extent the sequence of prompts will depend upon the source of the data and the function to be performed by the apparatus. If the data is coming via the RS232 port, the display will first indicate particular settings previously established for the Baud rate, the word length, the number of stop bits, and the parity. If the settings are correct, the "yes" button is operated. If those settings are not suitable for the intended operation, the "no" button is operated. The apparatus will then step through a series of prompts, all answerable by either "yes" or "no", which will permit the operator to establish a new set of operating conditions/parameters.

Similar prompts, if needed, are also provided which are relevant to the other sources of data. For instance a prompt will request whether an EPROM is to be inserted and, if so, then instructs that action to be taken.

The destination of the data also needs to be determined and prompts will in a similar manner ascertain that information, as well as any additional needed information. If the destination is to be RAM memory, for instance, which will store the information for programming of the EPROM, the "yes" button is operated when the prompt for RAM as a destination is displayed.

Then a prompt concerning transfer of data will be displayed. At the completion of the transfer, a prompt concerning verification will be displayed. The operator will typically press the "yes" button and verification will commence. The operator may then press any key, and the series of prompts returns to its starting point.

As an example, if programming information is present in RAM, the next operation will be to use the information in RAM to program the EPROM. When the correct prompt is displayed for programming and the "yes" button operated, the programming firmware in the apparatus EPROM 54 (FIG. 3) will control the programming of the user EPROM 53 in accordance with the fast algorithm for the particular EPROM being programmed and in accordance with the programming information in RAM. When that operation is complete, the programmed EPROM can be removed and used. The apparatus is then initialized for the next operation.

By means of the yes/no operator responses, the apparatus of the present invention can be conveniently and effectively used by a relatively unskilled serviceman. It does not require a trained engineer or programmer. In addition to the yes and no buttons, a third button 96 in FIG. 3 is labeled "cancel". The "cancel" button causes the last previous response to be cancelled. The prior prompt will then reappear on the display. The "cancel" button permits the operator to correct a prior instruction. This feature also is of assistance to the unskilled serviceman.

Figure 4:
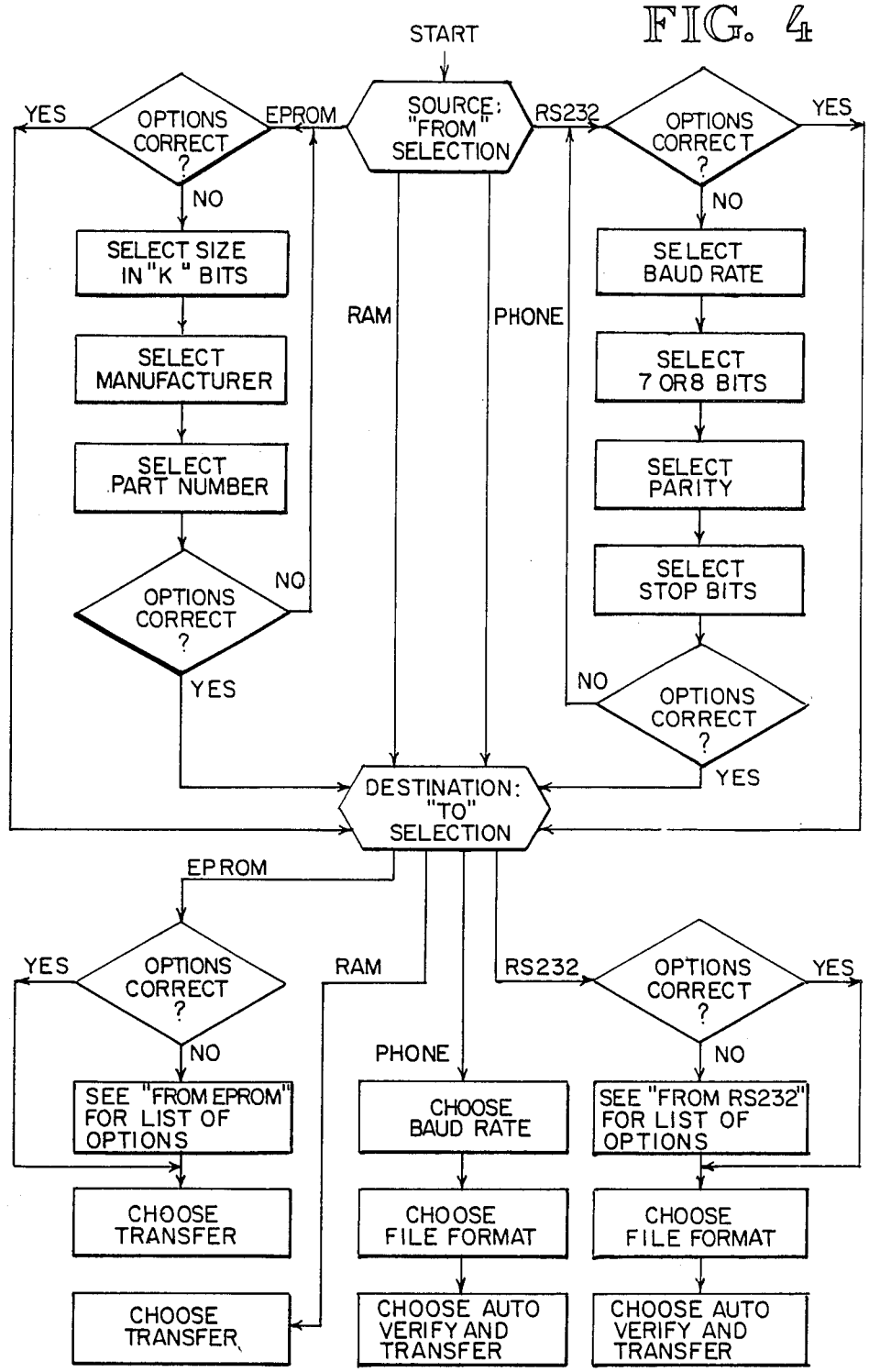
FIG. 4 is a generalized flow chart of a computer program which partially controls the operation of the apparatus of the present invention.

FIG. 4 is a simplified flow chart of the computer program (firmware) in EPROM 54, showing in particular the decisions made by the operator in the use of the apparatus. The decisions include the selection of the source of the data and the destination of the data concerning the various user elements in the apparatus of the present invention, as well as the other primary decisions which accompany those selections.

One of four sources may be selected. When the EPROM or the RS-232 are selected as sources, there are several additional decisions to be made, as set forth in FIG. 4, beginning with ascertaining whether the previous selections for that source are still appropriate.

When the destination is selected, between the four possible choices, as shown, other selections must be made, as shown. When the required selections have been made by the operator, a transfer instruction will be provided, which will result in a transfer of the data between the selected source and the selected destination.

Figure 5A:
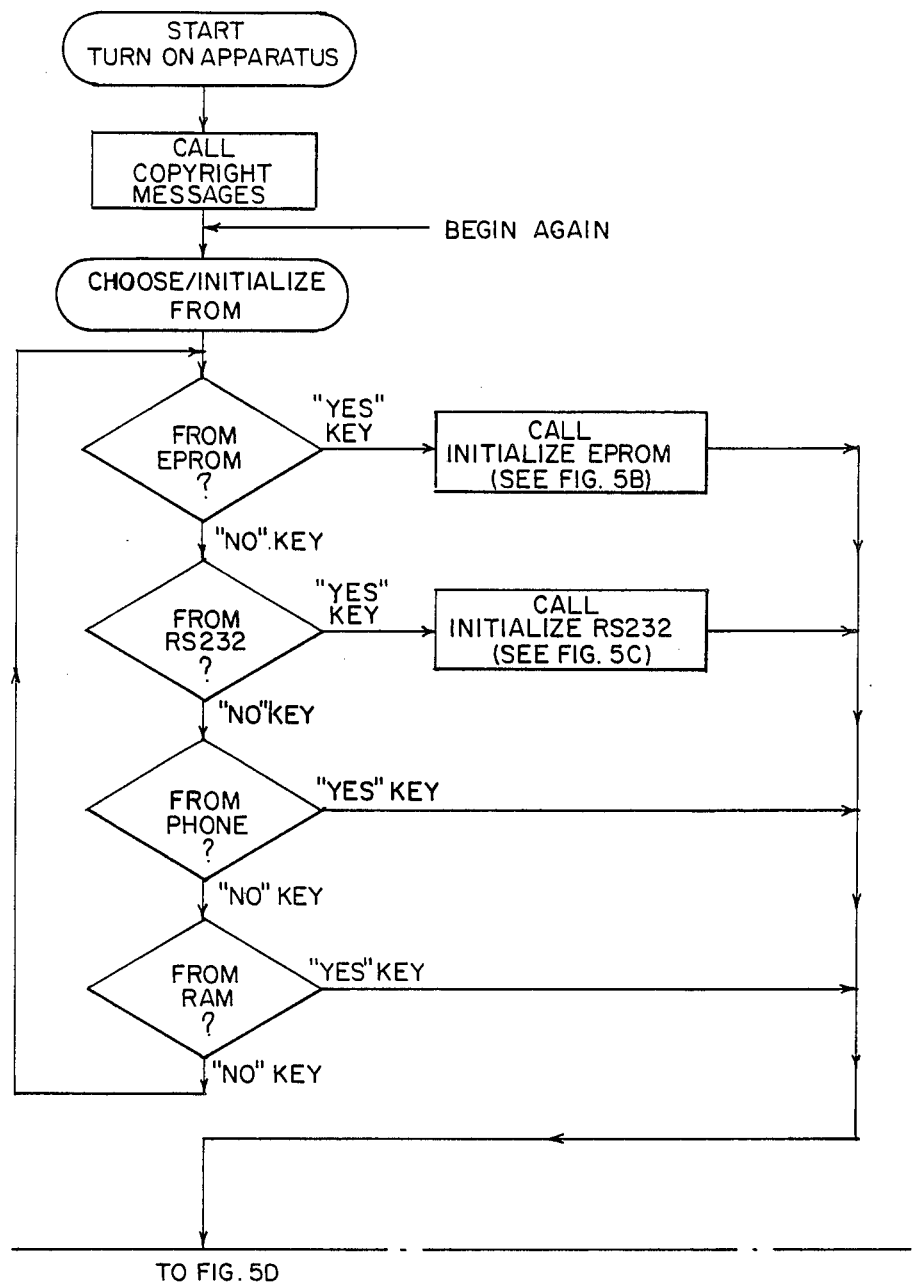
Figure 5B:
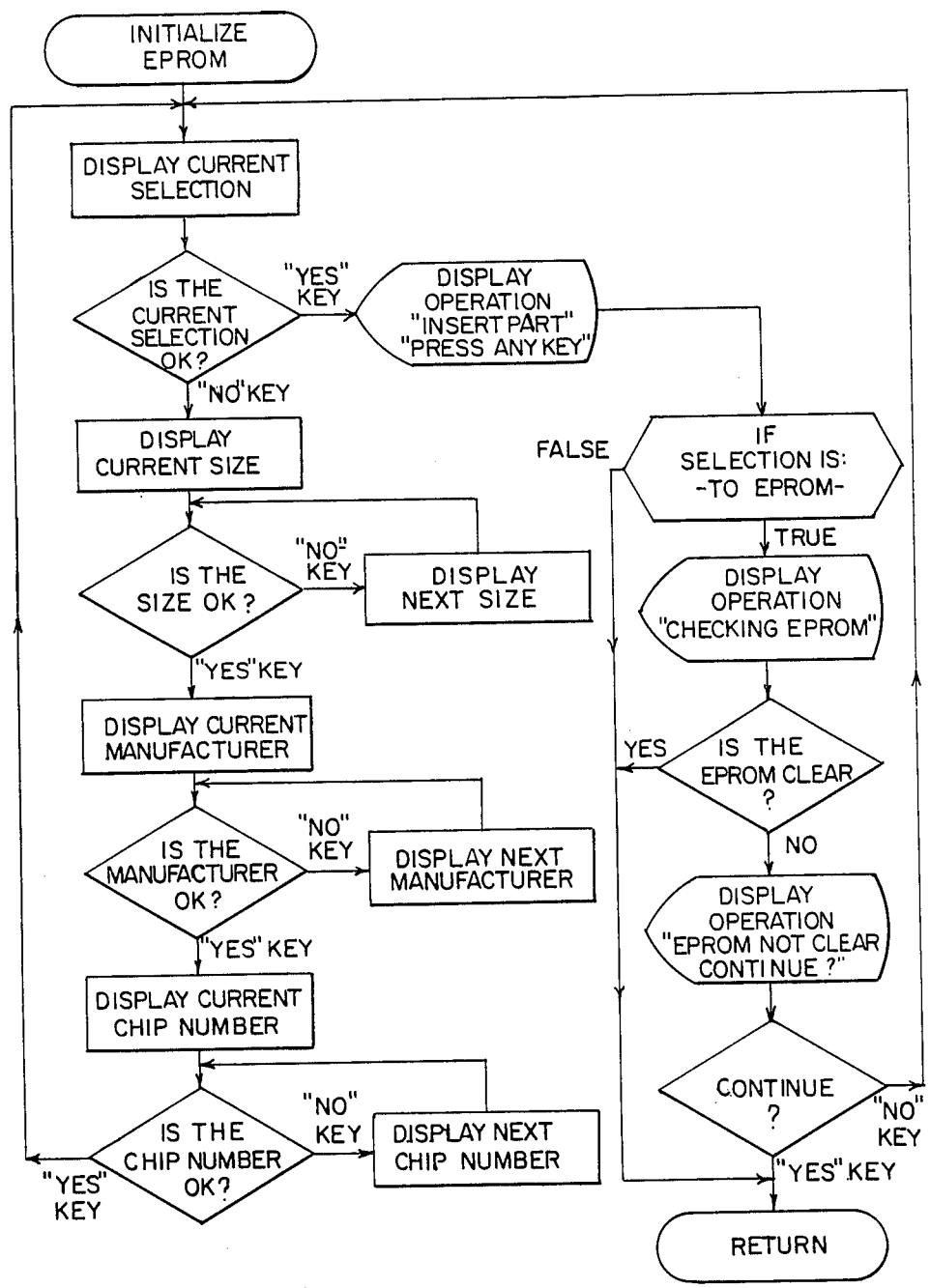

FIGS. 5A–5K show a more detailed flow chart of the firmware in EPROM 54. FIG. 5A shows the start procedures for the apparatus, as well as the possible selections for the source of the data. If the EPROM is selected, there will be a further sequence of prompts, as shown in FIG. 5B, which shows in some detail the sequence of operations relative to the selection of the EPROM as a source. The prompts in FIG. 5B concerning the size of the EPROM, the manufacturer of the EPROM, and the chip number relate to information which accompanies the apparatus and is thus available to the operator. At the conclusion of the portion of the program in FIG. 5B, there is a "return" to the point in the program where one left off, e.g. in the case of FIG. 5B, the return is to the point shown in FIG. 5A when the source of data is being selected.

Figure 5C:
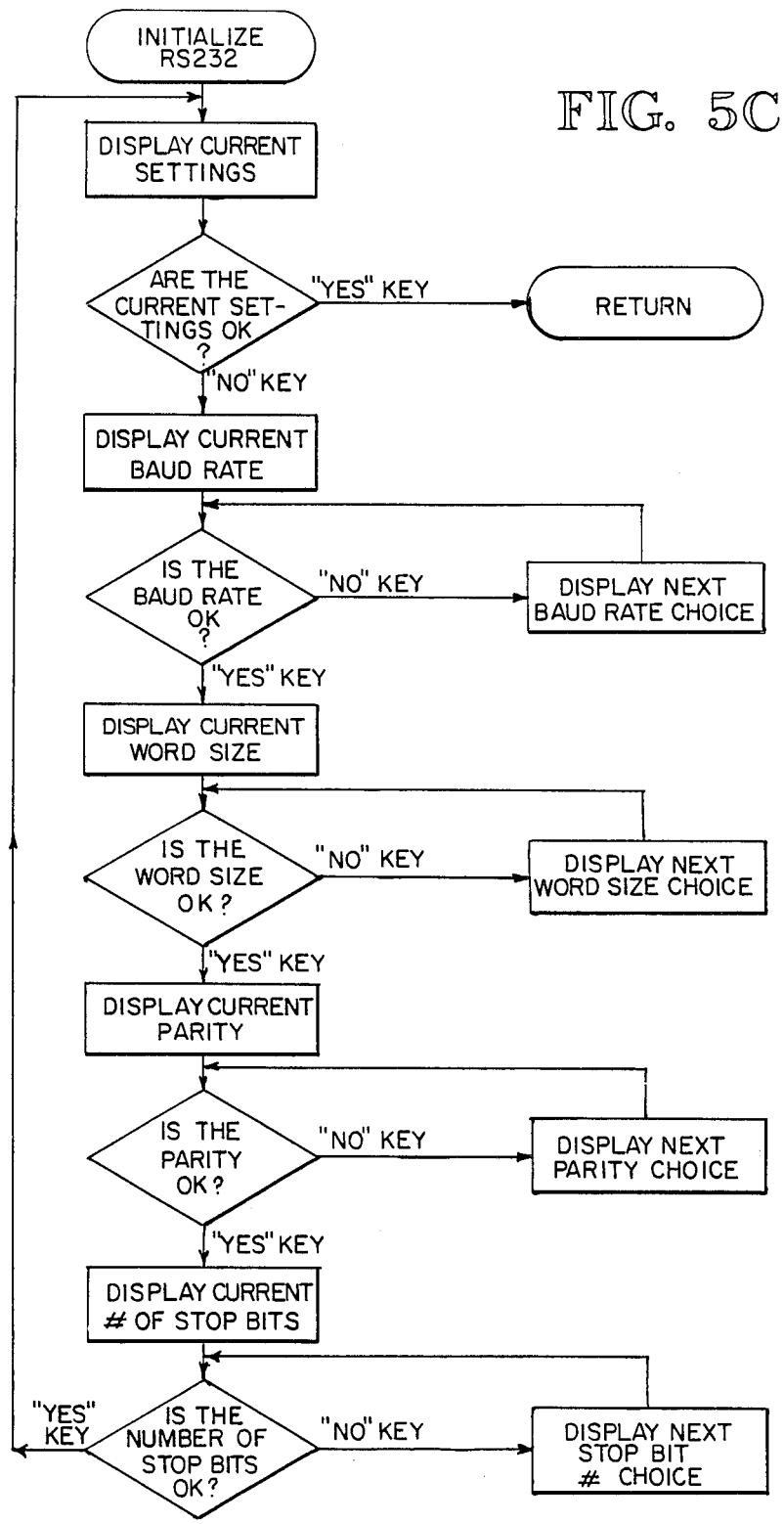
Figure 5D:
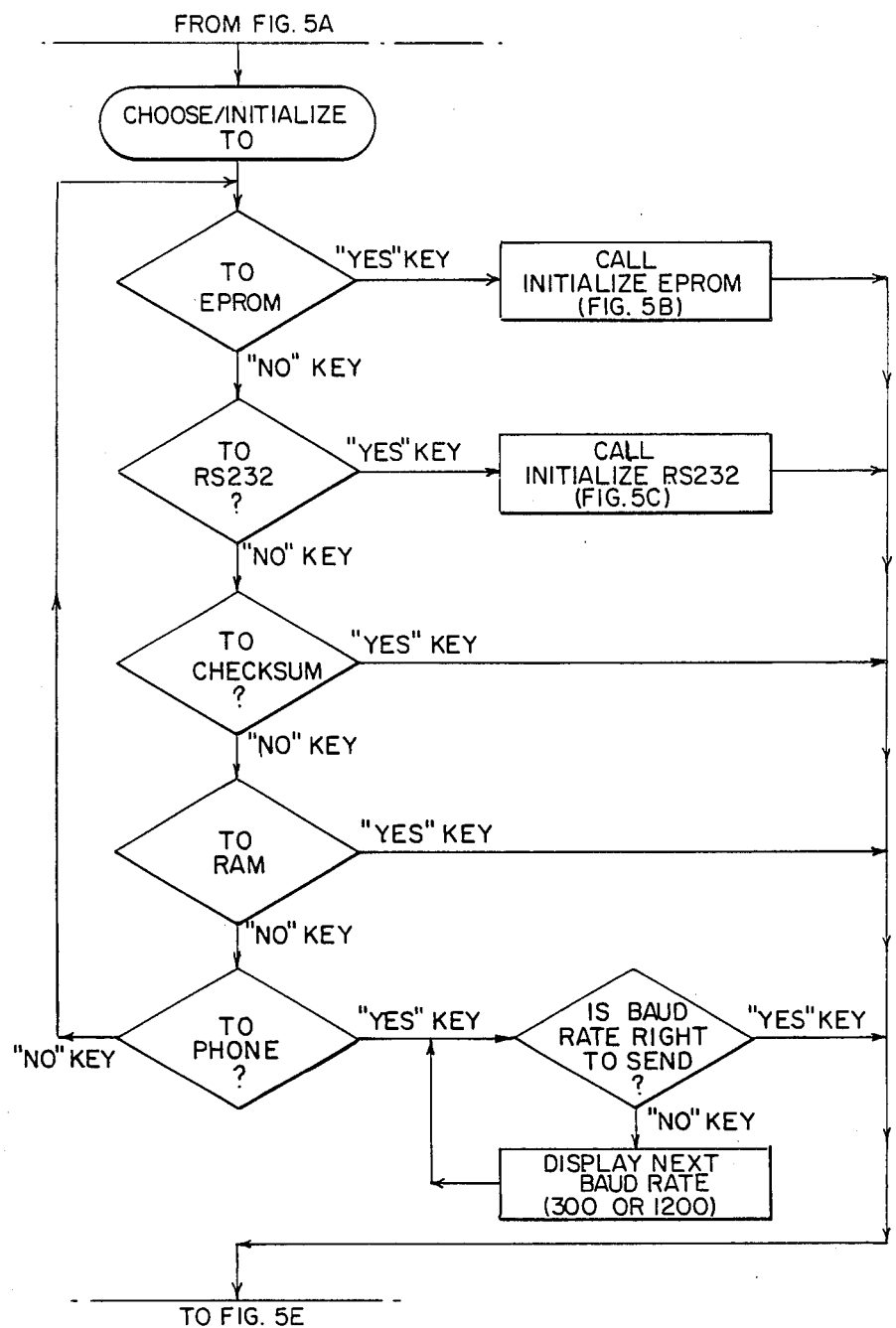

FIG. 5C shows the sequence of operations for the initialization of the RS-232 port when that element is selected as a source of data. The information requested with respect to baud rates, word sizes etc. are provided with the apparatus. FIG. 5D shows the selection of the destination of the information after the initialization of the selected data source has been completed. FIG. 5D is thus somewhat familiar to FIG. 5A. If either the EPROM or the RS-232 unit are selected, they must be initialized in the manner shown in FIGS. 5B and 5C.

The checksum selection in FIG. 5D refers to the conventional checksum generated by a set of EPROM program data, and allows checking of the accuracy of the contents of an EPROM by simply reading the EPROM contents (the program) compiling the standard checksum for those contents, and displaying that checksum. The displayed checksum can then be compared with the known accurate checksum of that particular EPROM and program. Such a method greatly simplifies determination of whether or not the contents of an EPROM have been corrupted (altered) and can be of great benefit during troubleshooting. If the checksums match, then the service personnel knows immediately to look for the problem elsewhere than in the program. Conversely, mismatched checksums indicate a problem in the EPROM program.

Figure 5F:
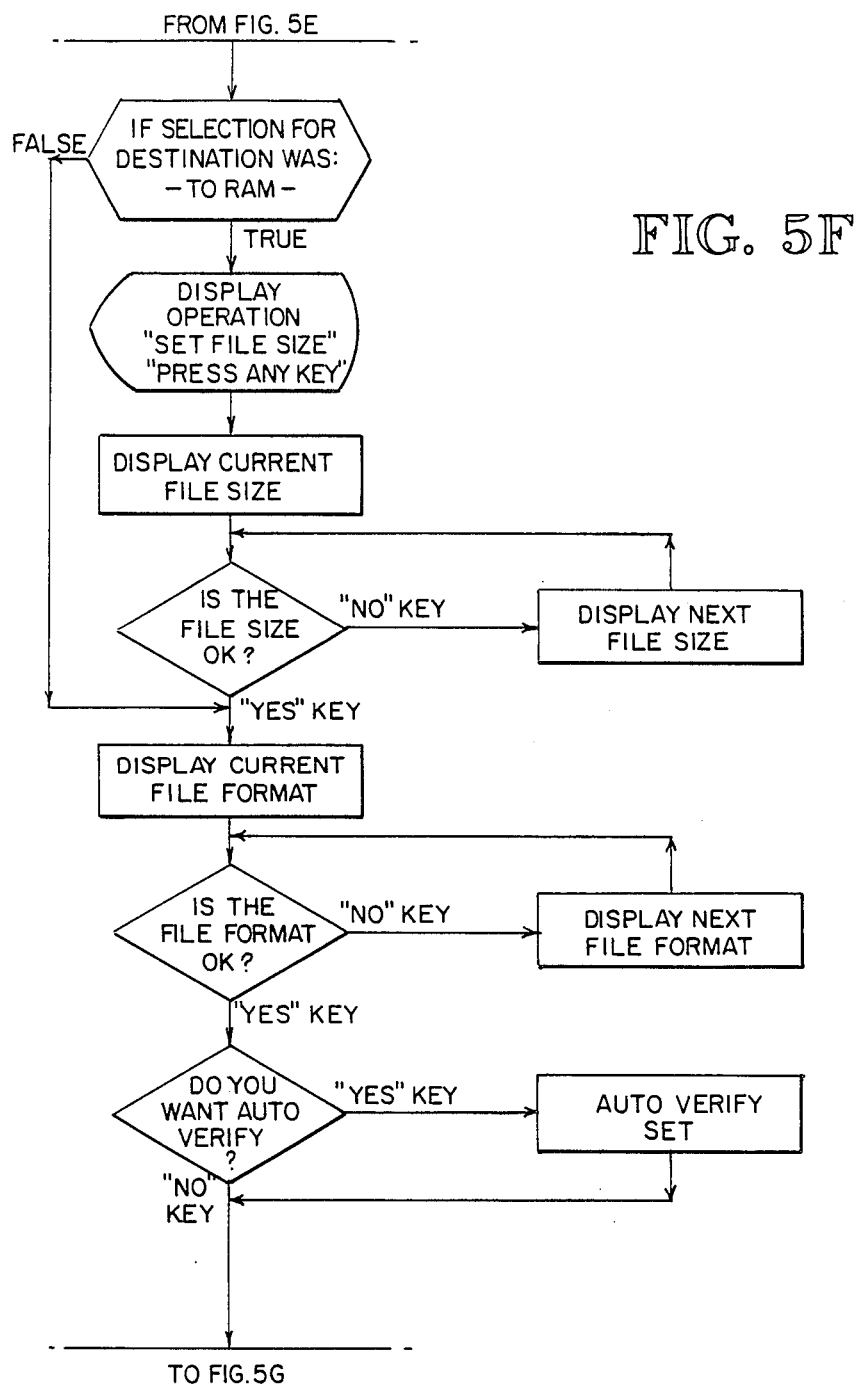

FIG. 5E shows the various data paths within the apparatus 10, and points toward the next level of selections to be made. FIG. 5F shows the selections relative to the initialization of the communication protocol, if necessary. If the destination of the data is RAM, there is a decision to make with respect to the file size, and following that or with respect to other destinations, the desired file format must then be selected from those available.

Figure 5G:
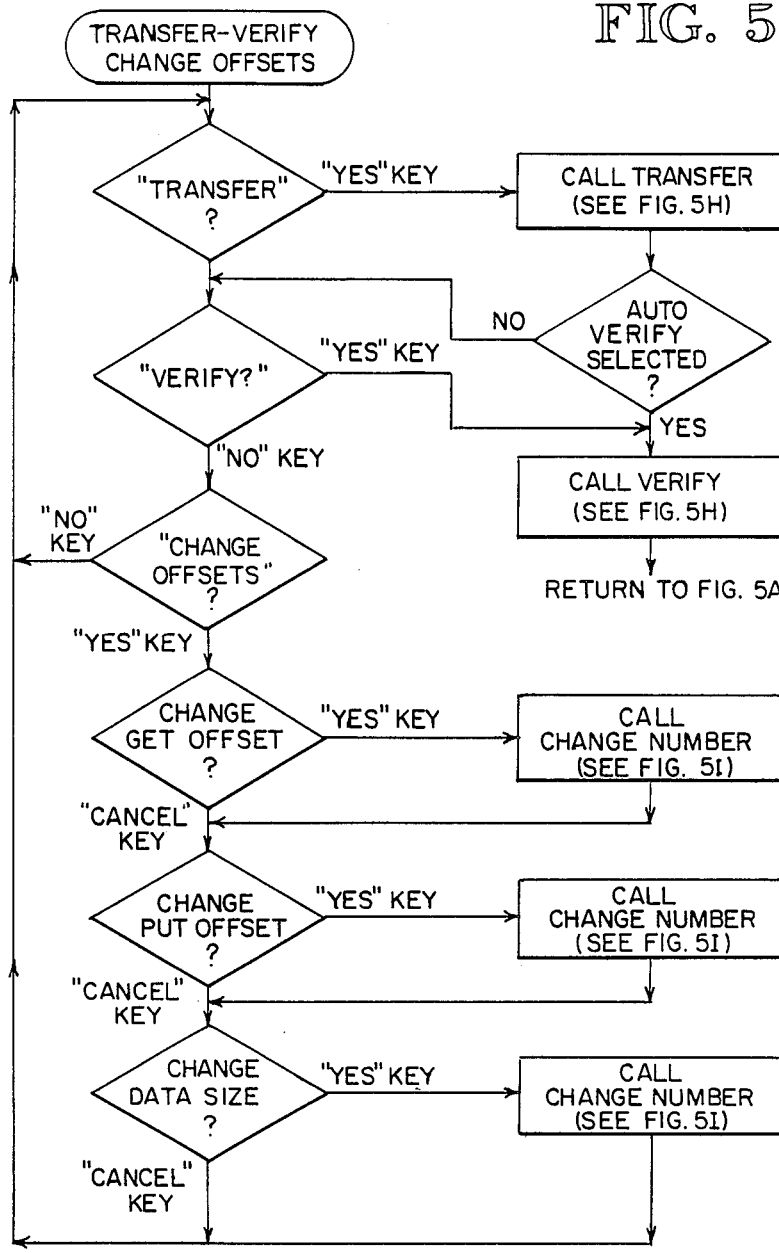

FIG. 5G shows the first part of the transfer operation. If a transfer is to be selected, or verified, the program shifts to the flow of selections shown in FIG. 5H. If the offsets of the data are to be changed, the selections shown in FIG. 5I are provided. Following the changes in offset, then a transfer or verify prompt is again provided.

With respect to the offsets, when the source of data is either the RS-232 port or the telephone, and the destination is RAM, only the "put" offset is available, i.e. the position where the data is to be placed. It is otherwise not possible to change the other offsets. FIG. 5I shows the flow of selections with respect to changing the offsets, on a digit-by-digit basis. The data offset is more fully explained above.

Figure 5H:
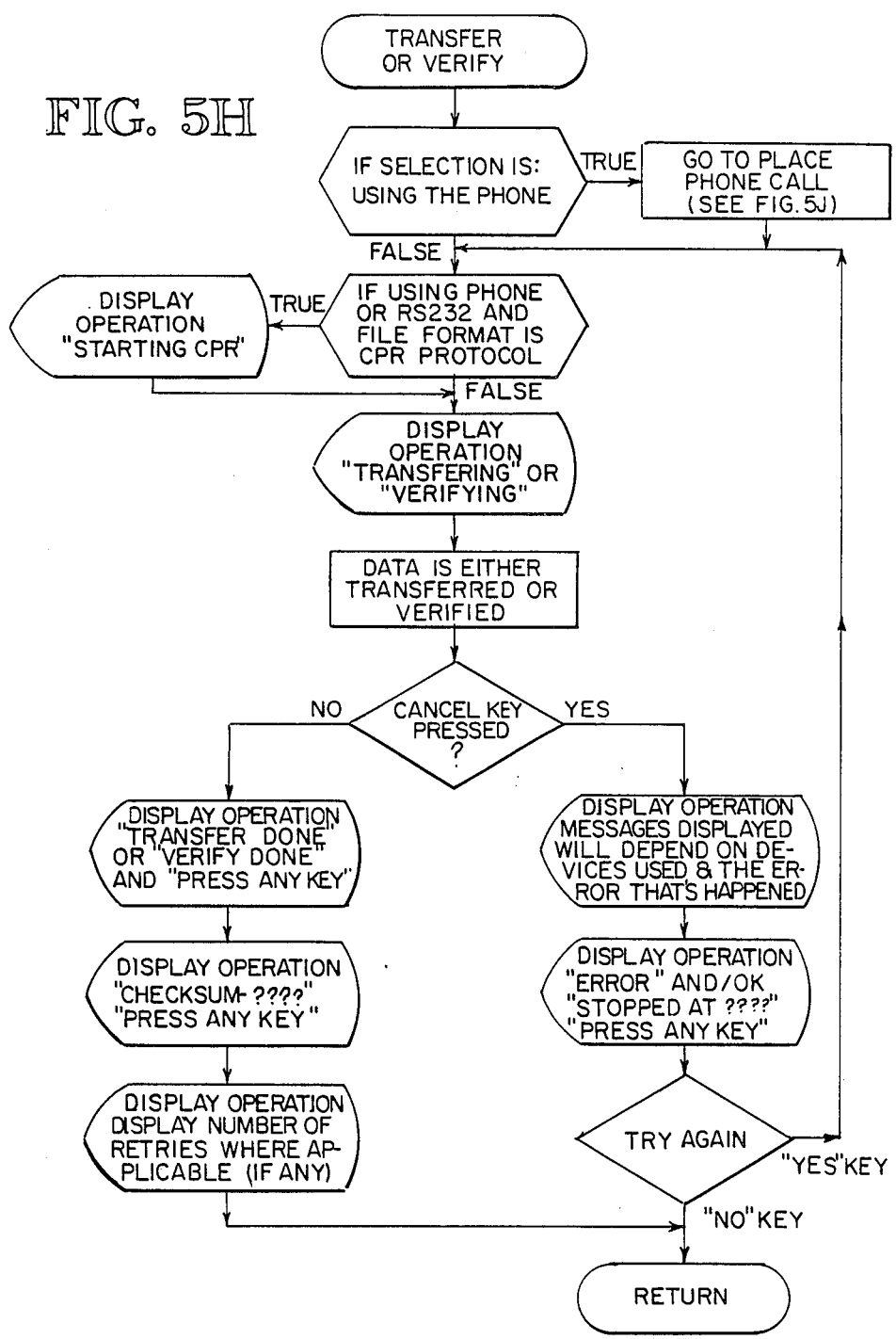
Figure 5I:
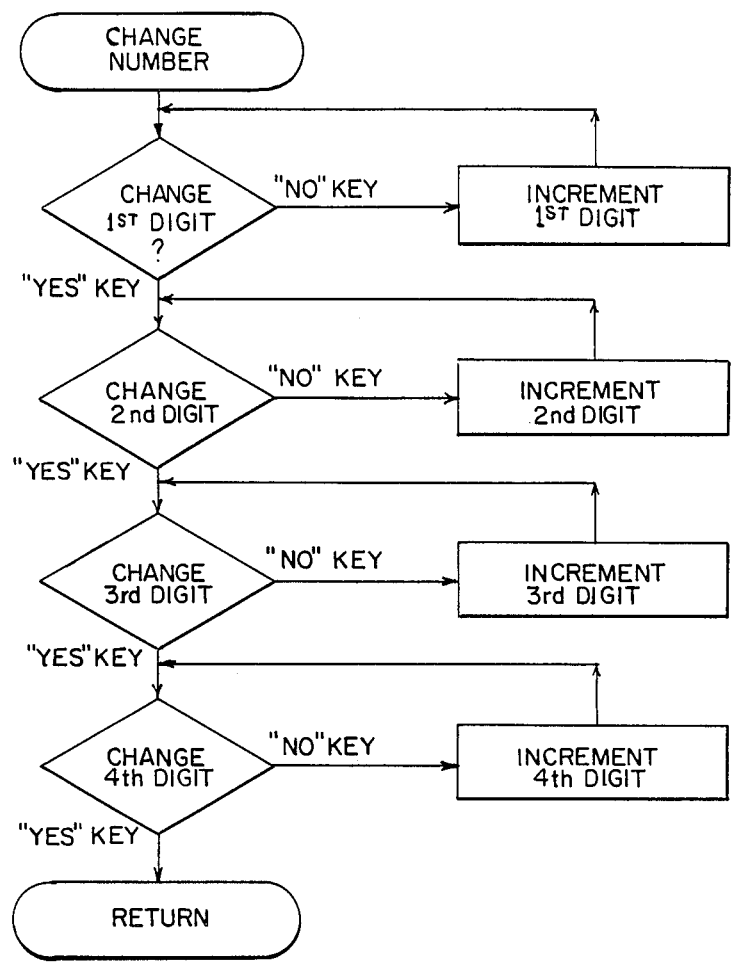
Figure 5J:
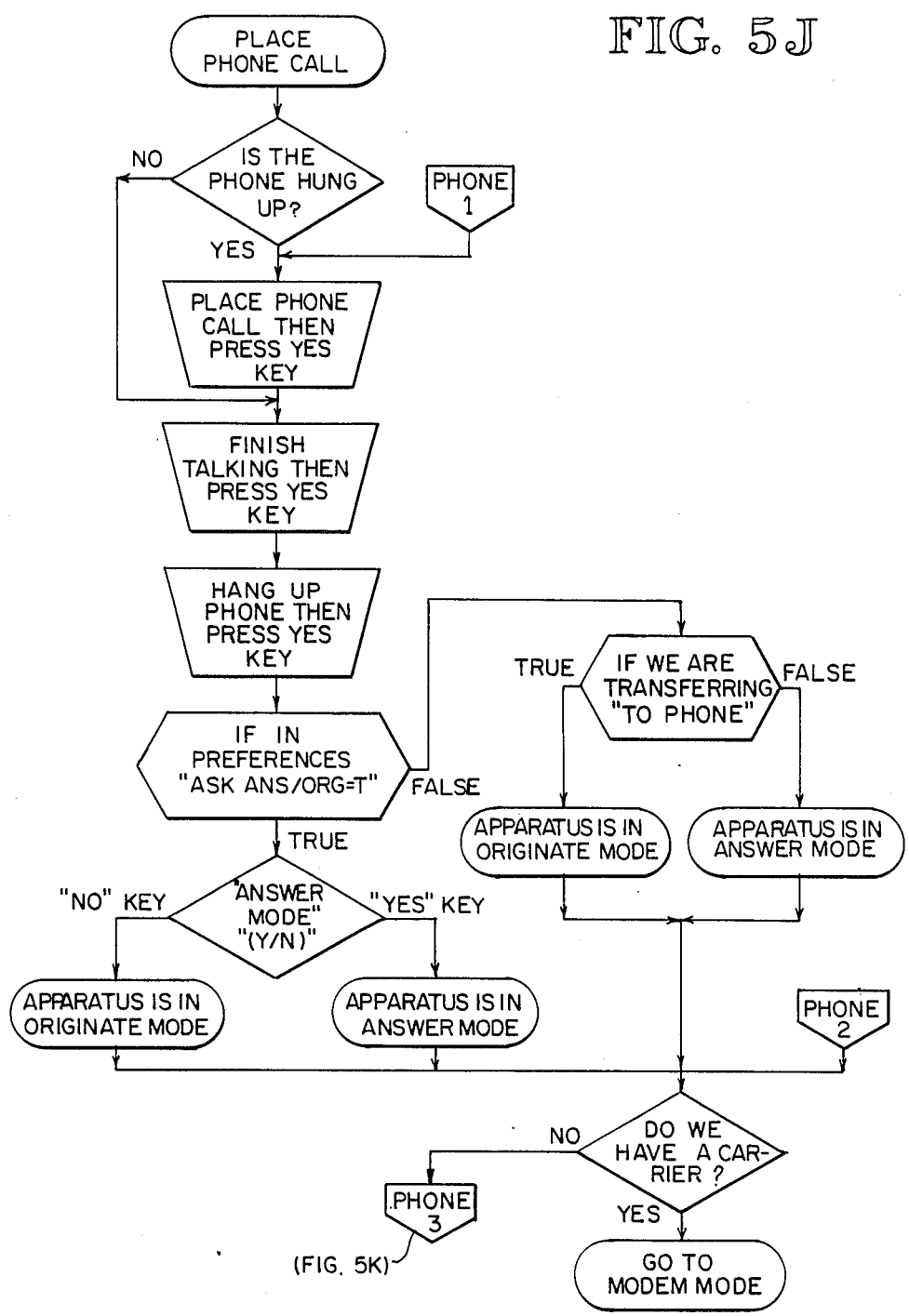
Figure 5K:
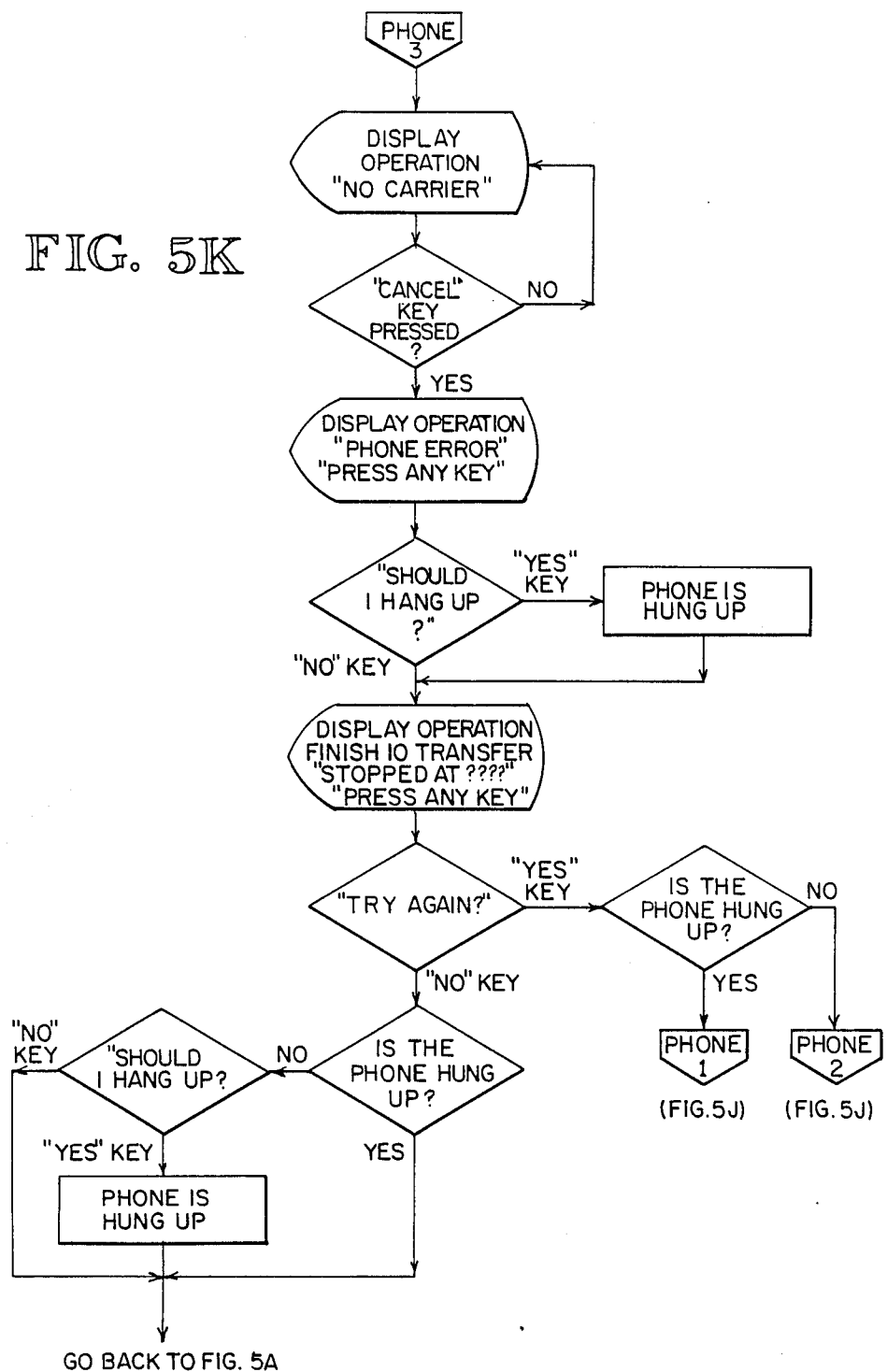

FIG. 5H shows selections in the flow of operations for the transfer of data between the selected source and the selected destination. In the event that a phone connection is to be included, the flow of operations shown in FIGS. 5J and 5K is utilized. FIG. 5J and 5K show the sequence for the placement of a telephone call, either when the phone is being used as the source or the destination of the information.

Although a preferred embodiment of the invention has been disclosed herein for illustration, it should be understood that various changes, modifications and substitutions may be incorporated in such embodiment without departing from the spirit of the invention as defined by the claims which follow.

We claim:

1. A portable apparatus for programming EPROM devices and the like with selected EPROM program information, comprising:
    means for selectively receiving and releasing an EPROM device to be programmed;
    means for accepting EPROM program information from, and for transmitting EPROM program information to, a remote source over telephone lines;
    means for accepting EPROM program information from, and for transmitting EPROM program information to, a local computer means or the like, including another said EPROM programming apparatus, wherein said computer means is separate from said EPROM programming apparatus;
    means for storing EPROM program information;
    means for communicating between said remote source information accepting/transmitting means, said computer means information accepting/transmitting means, and the EPROM program information storing means;
    means for programming a variety of EPROM devices with selected EPROM program information, wherein said EPROM programming apparatus is characterized by being arranged such that it can be conveniently carried to the site of the EPROM to be programmed; and
    means for verifying the accuracy of EPROM program information already present in the EPROM device to be programmed and for identifying any differences between said EPROM information already present in the EPROM and said selected EPROM program information.

2. An apparatus of claim 1, wherein said programming means includes the algorithms necessary to program substantially any EPROM device and wherein the apparatus includes means for accepting additional user-defined algorithms for programming EPROM devices.

3. An apparatus of claim 1, wherein the apparatus is arranged such that said means for accepting information from a remote source, said means for accepting information from a computer means, said information storing means and said programming means are capable of functioning either as a source or destination of information.

4. An apparatus of claim 1, including display means controlled by program means for communicating with the operator of the apparatus concerning the operation of the apparatus, including the programming of the EPROM device.

5. An apparatus of claim 4, wherein the program means is arranged such that only "yes" and "no" answers are required by the operator in order to operate the apparatus.

6. An apparatus of claim 1, wherein the rate of information received from the computer means may be set at any one of a plurality of specified rates, up to at least 19,200 baud.

7. An apparatus of claim 6, wherein said means for accepting information from a computer means includes a serial port and wherein the apparatus includes means recognizing and accepting information in any one of the following data formats: Intel, Motorola, MOS Technology and Tektronix.

8. An apparatus of claim 1, including a microprocessor means for controlling the operation of said apparatus, and further including latch means associated with said information storage means and the EPROM device to be programmed for multiplexing information on at least some address lines of the microprocessor and information on at least some data lines connected to the microprocessor so as to permit a greater number of addressable locations to be used in the apparatus than could otherwise be addressed by a given capacity microprocessor.

9. An apparatus of claim 8, wherein the address information for the microprocessor has 16 bits and the data information for the microprocessor has 8 bits, and wherein the apparatus includes means for multiplexing the data bits with the address bit at input/output pins of the microprocessor, and further includes means external of the apparatus for separating and temporarily storing those address bits which have been multiplexed with the data bits and for restoring those address bits to the remaining bits of a given address, if any.

10. An apparatus of claim 1, wherein said programming means includes means for programming the EPROM in at least two steps, wherein partial programming of the EPROM is accomplished in a first step with a first portion of said selected EPROM program information, and wherein further programming of the EPROM is accomplished in a second step with a second portion of said selected EPROM program information.

11. An apparatus of claim 1, including means for selecting a particular location in the EPROM where the programming thereof is to begin or a particular location in said storing means from which the selected EPROM program information is taken.

12. An apparatus of claim 1, wherein said portable apparatus is battery powered.

13. An apparatus of claim 1, including means for performing a check sum verification of the EPROM program information in the EPROM.

14. An apparatus of claim 1, including means for error checking EPROM program information as it is accepted from said remote source or said computer means.

15. An apparatus of claim 1, wherein said communicating means includes means for communicating between said remote source information receiving/transmitting means and said computer means information receiving/transmitting means without involving said storing means.

* * * * *